US008271478B2

(12) United States Patent
Hill et al.

(10) Patent No.: US 8,271,478 B2
(45) Date of Patent: Sep. 18, 2012

(54) FAST ALGORITHMS FOR COMPUTING SEMIJOIN REDUCTION SEQUENCES

(75) Inventors: Gerhard L. Hill, St. Leon (DE); Thomas Peh, Heidelberg (DE)

(73) Assignee: SAP AG, Walldorf (DE)

( * ) Notice: Subject to any disclaimer, the term of this patent is extended or adjusted under 35 U.S.C. 154(b) by 913 days.

(21) Appl. No.: 11/494,065

(22) Filed: Jul. 27, 2006

(65) Prior Publication Data

US 2008/0027904 A1 Jan. 31, 2008

(51) Int. Cl.
*G06F 7/00* (2006.01)
*G06F 17/30* (2006.01)

(52) U.S. Cl. ........................................ 707/714; 707/719
(58) Field of Classification Search ...... 707/2, 769–770, 707/714, 718–719
See application file for complete search history.

(56) References Cited

U.S. PATENT DOCUMENTS

| | | | | | |
|---|---|---|---|---|---|
| 4,769,772 | A | * | 9/1988 | Dwyer ........................... | 707/714 |
| 4,811,207 | A | * | 3/1989 | Hikita et al. ..................... | 707/2 |
| 5,412,804 | A | * | 5/1995 | Krishna .......................... | 707/2 |
| 5,608,904 | A | * | 3/1997 | Chaudhuri et al. .............. | 707/2 |
| 5,659,725 | A | * | 8/1997 | Levy et al. ...................... | 707/3 |
| 5,671,403 | A | * | 9/1997 | Shekita et al. .................. | 1/1 |
| 5,822,747 | A | * | 10/1998 | Graefe et al. ................... | 707/2 |
| 6,088,691 | A | * | 7/2000 | Bhargava et al. ................ | 707/2 |
| 6,272,483 | B1 | * | 8/2001 | Joslin et al. ..................... | 706/62 |
| 6,421,657 | B1 | * | 7/2002 | Sinnott, Jr. ..................... | 707/2 |
| 6,516,310 | B2 | * | 2/2003 | Paulley .......................... | 707/2 |
| 6,567,802 | B1 | * | 5/2003 | Popa et al. ...................... | 707/3 |
| 6,618,729 | B1 | * | 9/2003 | Bhashyam et al. ............... | 1/1 |
| 6,785,673 | B1 | * | 8/2004 | Fernandez et al. ............... | 707/3 |
| 7,330,848 | B2 | * | 2/2008 | Chaudhuri et al. .............. | 707/3 |
| 7,356,526 | B2 | * | 4/2008 | Gao et al. ....................... | 1/1 |
| 2004/0122798 | A1 | * | 6/2004 | Lin et al. ........................ | 707/2 |
| 2005/0065927 | A1 | * | 3/2005 | Nouri et al. ..................... | 707/4 |
| 2005/0160102 | A1 | * | 7/2005 | Abdo et al. ..................... | 707/100 |
| 2006/0074901 | A1 | * | 4/2006 | Pirahesh et al. ................. | 707/5 |
| 2007/0061288 | A1 | * | 3/2007 | Fuh et al. ........................ | 707/2 |
| 2007/0250331 | A1 | * | 10/2007 | Liu et al. ........................ | 705/1 |

OTHER PUBLICATIONS

IBM Technical Disclosure Bulletin, Deriving a Heuristic Function of an A* Search for Reducers in Query Processing, Dec. 1, 1990, vol. 33, issue 7, pp. 454-457.*
Joan Morrissey, Minimizing Data Transfers in Distributed Query Processing: A Comparative Study and Evaluation, The Computer Journal vol. 39, No. 8, publsihed Nov. 22, 1996, pp. 676-687.*
Ming-Syan Chen, USing Join Operators in Distributed Query Processing, IEEE, publsihed 1990, pp. 116-123.*
Ming-Syan Chen, Interleaving A Join Sequence with Semijoins in Distributed Query Processing, IBM Watson Research Center, pp. 1-15.*

(Continued)

*Primary Examiner* — Jeffrey A Burke
(74) *Attorney, Agent, or Firm* — Mintz, Levin, Cohn, Ferris, Glovsky and Popeo, P.C.

(57) ABSTRACT

Systems and methods for using optimization techniques to construct a nearly optimal execution plan for an outer join query are disclosed. A query graph of the outer join query is constructed, by computing for each node the set of nodes influencing it, for each target node the set of its needed reducers, and predetermining the effects of all admissible moves in all possible sequences. The directed graph of all admissible move sequences is formed. An optimization process includes dynamically generating good estimations for the target distance of a search state. Some heuristics are disclosed for providing start solutions for the optimization process.

17 Claims, 3 Drawing Sheets

OTHER PUBLICATIONS

Jo-Mei Chang, A Heuristic Approach to Distributed Query Processing, Bell Labs, 8th VLDB Proceedings, published 1982, pp. 54-61.*
Gerhard Hill and Andrew Ross, Reducing Outer Joins, The VLDB Journal, published 2009, pp. 599-610.*
Cesar Galindo-LEgaria and Arnon Rosenthal, Outerjoin Simplification and Reordering for Query Optimization, ACM Transactions of Database Systems, vol. 22, No. 1, Mar. 1997. pp. 43-74.*
Chihping Wang, On Complexity of Distributed Query Optimization, IEEE Transactions on Knowledge and Data Engineering, vol. 8, No. 4, Aug. 1996.*
Najaar et al., "The Enhancement of Semijoin Strategis in Distributed Query Optimization", EURO-PAR 1998; pp. 528-533 (1998).
Berntein et al., "Using Semi-Joins to Solve Relational Queries", Journal of the ACM, 28(1): pp. 25-40 (1981).
Bernstein et al., "Query Processing in a System for Distributed Databases (SDD-1)", ACM Transactions on Database Systems, 6(4): pp. 602-625 (Dec. 1981).
Yoo et al., "An Intelligent Search Method for Query Optimization by Semijoins", IEEE Transactions on Knowledge and Data Engineering, 1(2): pp. 226-237 (Jun. 1989).
Chen et al., "Combining Join and Semi-Join Operations for Distributed Query Processing", IEEE Transactions on Knowledge and Data Engineering, 5(3): pp. 534-542 (Jun. 1993).
Najjar et al., "Distributed Optimization of Cyclic Queries With Parallel Semijoins", Database and Expert Systems Applications, Proceedings, Ninth International Workshop, IEEE Comput. Soc, pp. 717-722 (Aug. 26, 1998).

* cited by examiner

```
determine (trivially) join size and cost for all 1 relation subjoins of  J ;
    for n = 2 to N:
    {
        for all connected  n  relation subjoins  S  of  J:
        {
            estimate the join size of  S ;
            estimate the cost of  S  as follows:
            {
                for all partitions  S = S1 U S2  into non-empty disjoint connected subjoins:
                    compute the cost of  S  by joining S1 and S2 ;
                cost of  S  is the minimum cost over all choices of S1 and S2 ;
            }
        }
    }
```

(PRIOR ART)

FAST ALGORITHMS FOR COMPUTING SEMIJOIN REDUCTION SEQUENCES

BACKGROUND

This disclosure relates generally to computer-based mechanisms for optimizing a database query, and more particularly to optimization of outer join query execution plans where all joins are evaluated by semijoins.

In relational databases, a relation represents a set of entities such as customers or products as an association between properties of the entities called attributes. An element of a relation is an ordered set of associated properties called a tuple. A relational database contains tables of data, and each table implements a relation. Each row in the table represents a tuple in the relation. Each column represents a value range of an attribute, such that each cell in the column contains a value, which may be a repeated value or a null value.

A central task in enterprise data processing is to extract from a relational database the set of tuples that meet some given logical condition. Often, the task is to extract tuples that each contain values from more than one table in the database. A table for relation A can include a column for the same attribute as another table for relation B. In such cases, the tables A and B can be joined logically by matching rows via the values of this attribute. To extract a specified set of tuples that include properties from several tables, the respective tables need to be joined.

Search and classification systems, such as the SAP NetWeaver TREX system, perform many tasks, including extraction of tuples that meet given logical conditions. In such cases, the task is called a search request or a database query, and the set of tuples that meet the logical condition specified in the query is called the result set. In order to perform such tasks with the required efficiency, a system like TREX uses highly optimized techniques for joining tables. One such technique is described in more detail below.

A join is a special case of a search condition of a database query characterized by having an expression of the form A.x=B.y, where A and B are two relations within a database, x is an attribute of A and y is an attribute of B.

In many cases, join operations are computationally expensive. For this reason, much research has been devoted to devising efficient algorithms for resolving them. For example, techniques for performing a hash join, a sort merge join, a join via semijoin, and nested loop join are well known to those of skill in the art.

For a join between two relations A and B on the condition A.x=B.y, the following standard notation is used:

Inner join: A-B. The inner join consists of all pairs (a,b) with a∈A, b∈B such that a.x=b.y. The inner join is commutative: A-B equals B-A up to position swap.

Left outer join: A→B. The left outer join consists of the inner join plus the left exception join. These are the pairs (a,-) for those a∈A such that no b∈B satisfies a.x=b.y. It is used if the content of A needs to be preserved by the join. Every a∈A occurs as a first component either in the inner join or in the left exception join. Left outer joins in general are not commutative.

Right outer join: A←B. The right outer join consists of the inner join plus the right exception join. These are the pairs (-,b) for those b∈B such that no a∈A satisfies a.x=b.y. The content of B is preserved. The right outer join A←B equals the left outer join B→A up to position swap.

Full outer join: A←→B. The full outer join consists of the inner join plus the left exception join plus the right exception join. It is the set union of A→B and A←B. Full outer join is commutative: A←→B equals B←→A up to position swap.

One tool used for working with join queries is a query graph. The query graph is obtained from the query by generating a vertex for every relation in the join and forming an edge between any two vertices joined by a join condition. The query graph contains a distinguished set of nodes called a target. The target corresponds to those relations where the exact projection of the join needs to be determined. The target comprises those relations having attributes requested in the "select" clause of the query's select statement. Hence it is always non-empty. It is always connected.

Search and classification systems, such as the SAP NetWeaver Text Retrieval and Extraction (TREX) system, typically evaluate joins using only semijoin techniques, which in turn are usually used only for evaluating inner joins. A method of performing a semijoin, and its extension for outer joins, will now be described.

In the semijoin technique, for every relation A in the join and every join J in which A participates, a "tuple list" T(A,J) is created. This list contains "real" pairs (a,a.x), where a is a row identifier within A and x is the attribute of A referenced by J, and "virtual" pairs such as (a,x=−1) or (a=−3,x=−3). Virtual pairs are characterized by a negative second component. Virtual pairs of special importance are the connector pairs. For simplicity, it can be assumed that the two attribute names joined by a join condition are identical, such that the join condition can be written as a.x=b.x, and simply referred to as "the join x". Correspondingly, T(A,J) can be written as T(A,x).

A semijoin reduction step, used for reducing T(A,x) (where x is the join a.x=b.x between A and B) includes the following steps. At B, the list L of all occurring values b.x is constructed. L is sent to A over a communication line from the host of B to the host of A. We distinguish:

Case 1: There is no arrowhead at B. That is, x is either the inner join

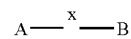

or the right outer join

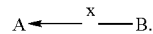

In this case, all tuple lists at A are reduced. For every real pair (a,a.x) whose attribute value a.x is not present in L, the pairs having the first component a are removed from all tuple lists at A. In every tuple list there is at most one such pair.

Case 2: There is an arrowhead at B. That is, x is either the left outer join

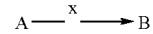

or the full outer join

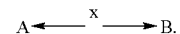

In this case, T(A,x) is switched. Every real pair (a,a.x) whose attribute value a.x is not present in L is switched to a virtual pair with the same row identifier, such as (a,x=−1).

For brevity, a semijoin reduction step can be referred to as a move.

A relation R influences a tuple list T if R can decrease the number of real pairs in T (by reducing or switching them). If R influences T(A,x), it can be said that R influences A. For any given tuple list T, it is a straightforward topological calculation, performed on the query graph, to determine which relations influence T. As a consequence, for any relation R in the target of the query graph, the set of relations needed to fully reduce R is then obtained as the simple union of those relations needed to fully reduce all of R's tuple lists. The relations needed to fully reduce one tuple list are obtained as a specific subset of the relations influencing it.

Within a sequence of semijoin reduction steps, a single semijoin reduction step reducing a tuple list T is admissible if this move transports at least one relation R to T as a reducer, such that: 1) R influences T; and 2) T has not been reduced by R before. A sequence of semijoin reduction steps is called admissible if each of its steps is admissible.

An important part of the query graph construction is also to determine the effects of all possible semijoin reduction steps in all admissible sequences. These effects in general depend on the types of all joins in the given query. The effects of a move are to reduce the cardinalities of some sets of reducers and of the tuple lists involved.

Outer Join Evaluation by Semijoins

With the above concepts in mind, the semijoin algorithm can be extended for the evaluation of outer joins. In accordance with one method, executing an outer join includes performing semijoin reduction steps, each semijoin reduction step switching one tuple list or reducing all tuple lists of one relation, until a predefined criterion is met. The predefined criterion can include every target relation being reduced by all the necessary relations. The method further includes adding virtual connector pairs to the tuple lists, and sending all the tuple lists to a common host for assembling the join result.

In some implementations, the predefined criterion for stopping the performing semijoin reduction steps may be changed. For example, the semijoin reduction steps may be performed so long as the reduction steps are "profitable," i.e., where profitability is defined in terms of some appropriate cost measure that need not necessarily refer to relation size. Further, in the assembly step, the virtual pairs are concatenated using a domino principle and then spliced together to obtain the resulting tuples of the join.

In general, the technique of semijoin reduction is particularly well suited for a distributed environment in which relations are usually located on different hosts. In such a situation, an important goal is to minimize communication costs among hosts. Communication costs are high where large intermediate joins are executed among distributed hosts, and then transmitted over a communication line.

Strictly speaking, the above description of the semijoin reduction technique is not yet an algorithm, since it does not describe the sequence in which to execute the semijoin reduction steps. This leaves a considerable degree of freedom, since in most cases a given join can be evaluated using many different execution plans. That is, many sequences are admissible. Further, all of these sequences lead to the same final reduction state of the tuple lists involved, indicated by the stopping criterion described above. However, the communication cost of obtaining the final reduction state may vary greatly, up to several orders of magnitude. As a practical approximation, the cost of a reduction sequence may be understood to consist only of the communication cost, which is the dominant component, and smaller contributions to the cost can be neglected. Communication costs thus have a major influence on the overall execution time of the query.

Conventional search and classification systems and database management systems use only dynamic programming to optimize joins in terms of costs. FIG. 1 shows an exemplary algorithm 10 for optimizing a join J involving N tables using dynamic programming. The dynamic programming algorithm is essentially a brute force search over a very large search space. Such a brute force search is justified only in the case that no other options are available. Variants of the search algorithm attempt to gain better results by restricting the search space to special forms of the evaluation tree.

What is needed is a query optimizer for minimizing communication costs of join execution processes, in particular for the variant of the optimization problem which is restricted to involve only semijoin reductions.

SUMMARY

In general, this document describes a system and method for using optimization techniques to construct a nearly optimal execution plan for an outer join query. The system and method begins by constructing the query graph of the outer join query. This construction involves computing for each join node the set of nodes influencing it, for each target node the set of its needed reducers, and predetermining the effects of all admissible moves in all possible sequences. The directed graph of all admissible move sequences is formed.

An optimization process is run which is based on dynamically generating good estimations for the target distance of a search state. Some heuristics are disclosed for providing start solutions for the optimization process. The system and method can further include modifying the basic search algorithm for resolving approximate draws for continuing a search. The method disclosed is faster than dynamic programming, the only widely known method used by commercial database systems, because the disclosed method has the advantage of a guided search over an uninformed brute force search.

The details of one or more embodiments are set forth in the accompanying drawings and the description below. Other features and advantages will be apparent from the description and drawings, and from the claims.

BRIEF DESCRIPTION OF THE DRAWINGS

These and other aspects will now be described in detail with reference to the following drawings.

FIG. 1 shows an algorithm for optimizing a join J involving N tables using dynamic programming.

Like reference symbols in the various drawings indicate like elements.

DETAILED DESCRIPTION

This document describes a system and method for optimization of outer join queries where all joins are evaluated by semijoins. In general, the system and method achieve optimization by using a general purpose optimization algorithm for searches on a directed graph ("digraph"), instead of standard dynamic programming as used by conventional systems and methods. Such an algorithm is referred to herein as A*.

Figure 2:
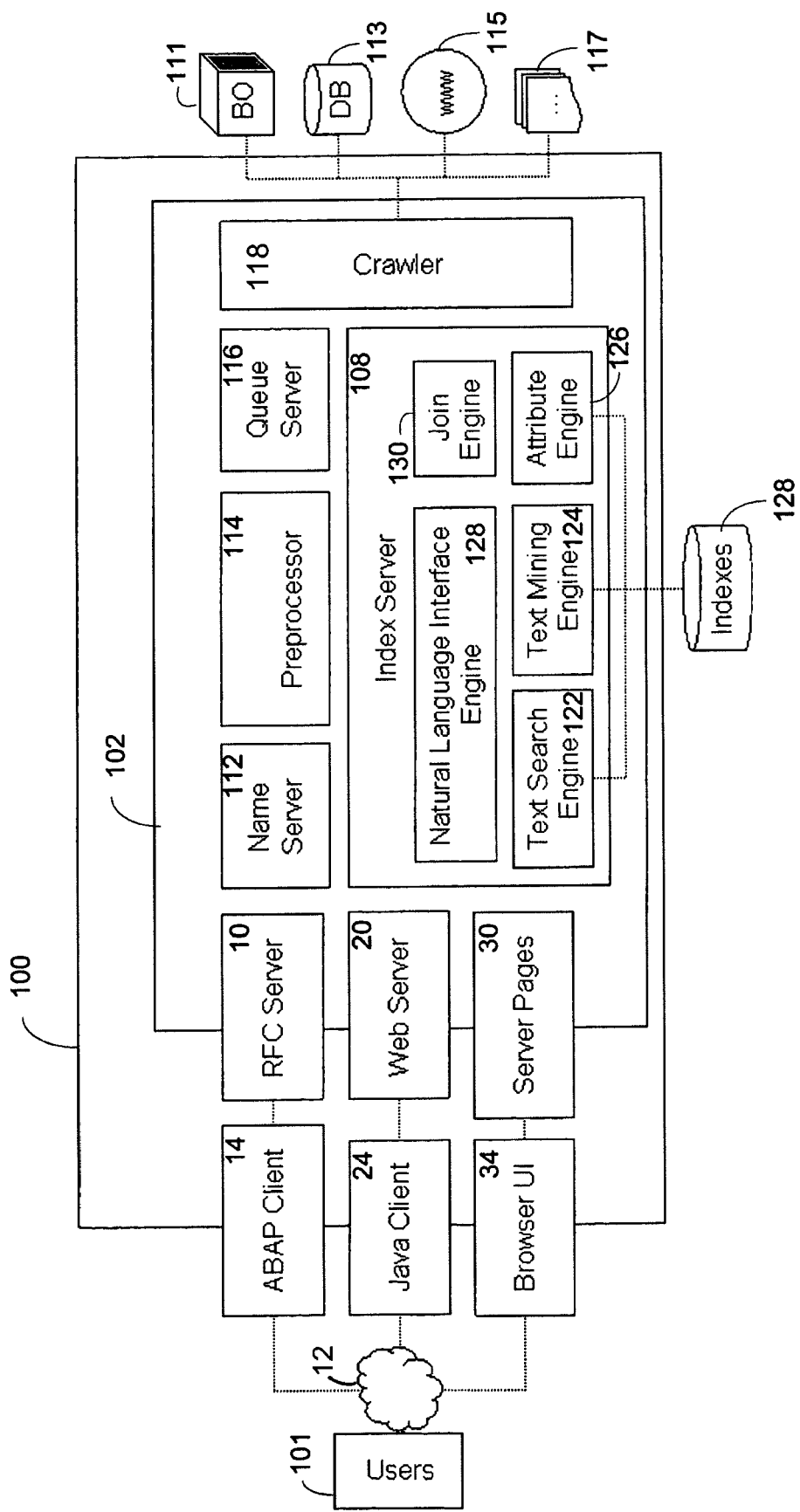
FIG. 2 is a block diagram of a search and classification system on which the disclosed techniques can be executed.

FIG. 2 shows a communication network 100 having a search and classification system 102 upon which the techniques of optimizing outer join queries can be executed. The exemplary embodiment of the information retrieval service system 102 is an SAP NetWeaver TREX (Text Retrieval and Extraction) search and classification engine system, developed by SAP AG of Walldorf, Germany. With the search and classification system 102, users 101 can search in various ways, and in particular can search in a way which is relevant to this disclosure, which is to say they can enter text which is logically equivalent to a query specified in an SQL-like syntax that requests the retrieval of certain information from a store of structured information, where the store may conform to a data model.

The search and classification system 102 receives queries in one of several ways. It may receive queries from a web server 20, which in turn receives hypertext transport protocol (HTTP) requests from a client 24, such as a JAVA client program. Alternatively, queries can also be received from a Remote Function Call (RFC) server 10 via a gateway 12 from a business application client 14 implemented in the SAP Advanced Business Application Programming (ABAP) language, or from server pages via a browser user interface 34.

The system 102 includes a name server 112, a preprocessor 114, a queue server 116, and a crawler 118. The name server 112 directs the incoming queries to the appropriate engine in an index server 108. The index server 108 includes several engines configured for particular types of searches, such as a text search engine 122, a text mining engine 124, an attribute engine 126, and their associated indices 128. Requests for searches on structured data are sent to the attribute engine 126, which initiates searches over the tables representing the relevant relations. Results of the search requests are returned to the user 101 via the web client or business application client.

The crawler 118 executes cruises of various sources of structured information including, without limitation, a set of business objects 111, a database 113, a website 115 such as the internet or other URL-based networks such as a corporate intranet, and/or a document repository 117. The index server 108 includes a natural language interface engine 128 to perform intelligent text-based searching and retrieval on natural language queries.

The index server 108 of the search and classification system 102 further includes a join engine 130 for executing joins. In search and classification systems, such as the TREX system, a user only indicates the desired result of a query, but does not specify a plan for achieving this. A query optimizer is provided with the join engine 130 for generating a query plan to optimally achieve the desired result. In such systems, a join optimizer is a component of the query optimizer, and is configured to choose a semijoin reduction sequence for which the communication cost is either the lowest possible or a least reasonably low, such costs being crucial to the overall performance the system. In preferred embodiments, the optimizers are pieces of executable code that process the query before the join engine 130 is activated.

The Digraph D

The set of all admissible sequences for semijoin reduction has the structure of a directed graph D, where the successor relation in D means that an admissible semijoin reduction step is appended. The root node in D corresponds to the empty sequence. The leaf nodes in D correspond to those sequences where all target nodes of the query graph have been fully reduced. Accordingly, determining an execution plan for the join is substantially equivalent to finding any leaf node in D, starting at the root. Finding the lowest cost execution plan includes finding the lowest cost leaf.

A general purpose algorithm exists for organizing an optimizing search on a directed graph. This algorithm is called the "A-Star" or "A*" algorithm and should be well known to those having skill in the relevant art. A variant of the A* optimization algorithm is used in the systems and methods described herein.

In accordance with preferred embodiments, the following notations and definitions apply. The vertices in D are also called SearchStates. Given the definition of a leaf node in D, these special SearchStates are also called target states. The cost of a SearchState will be explained below; one summand in the cost of the query execution is the cost of the reduction sequence represented by the SearchState.

Technically, any form of the A* algorithm maintains two lists of SearchStates. First, an OPEN list contains those SearchStates whose successors have not yet been constructed; it is ordered by increasing costs of its SearchStates. Second, a CLOSED list contains those SearchStates whose successors have been constructed. It is needed to retrieve the complete semijoin reduction sequence from any given SearchState.

In general, the A* algorithm runs as follows. The standard notation for the cost of a SearchState s is $f(s)$, which is decomposed as a sum $f(s)=g(s)+h(s)$. The first summand $g(s)$ is the cost for moving from the start state of the search to s, and hence is in general an exactly known quantity. In theory, the second summand $h(s)$ should equal the cheapest cost for moving from s to any leaf node of D. In practice, this cost is usually not known and must be estimated. The practical usefulness of the A* algorithm depends on a good estimation of $h(s)$. This estimation may not be arbitrary, and must satisfy several conditions. For example, while any good estimation should be as exact as possible, one of the conditions is that the estimation always underestimate the true cost, that is, the estimation should produce a close lower bound.

The benefit of a good estimation of $h(s)$ lies in the guidance that $f(s)$ gives toward the optimum. With a good estimation, virtually all of the usually immense graph D can be left unexplored. By contrast, a gross underestimation such as $h(s)=0$ allows the A* algorithm to work correctly in theory, but renders it completely useless in practice. In this case, the search degenerates to a complete enumeration of D in breadth-first order. Accordingly, an estimation for $h(s)$ of a SearchState s for optimization of semijoin reduction sequences is based on deriving a lower bound for the cost contribution of each edge of the query graph that will necessarily occur when passing from s to any target state of the search.

Figure 3:
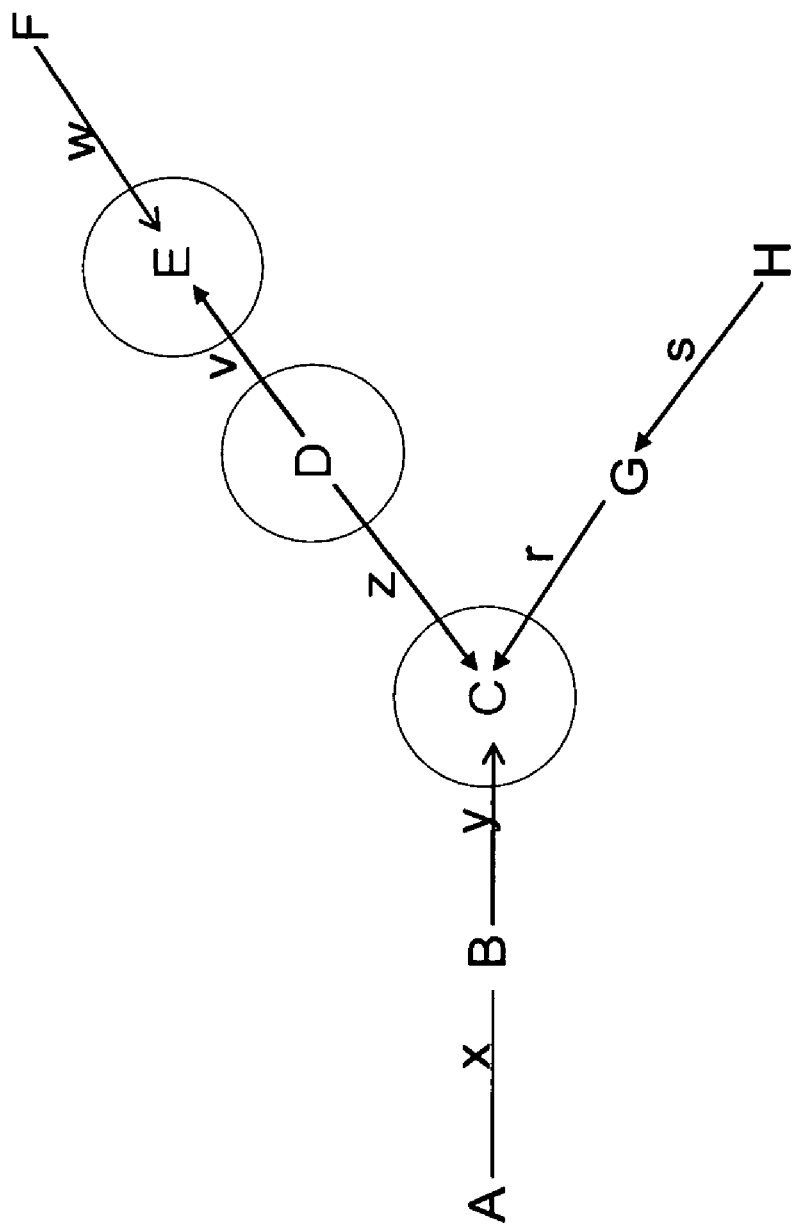
FIG. 3 illustrates an example query graph on which an outer join optimizing process can be executed.

FIG. 3 shows an example of a query graph, where target nodes C, D and E are circled. In accordance with this example, a lower bound is determined for any future cost to be incurred by the edge y. Edge y will be used at least in the direction from B to C, since otherwise $T(C,y)$, $T(C,z)$ and $T(C,r)$ could not get reduced by A and B.

The influence matrix of this query graph is:
A is influenced by B
B is influenced by A, C, D, G, H
C is influenced by A, B, D, G, H
D is influenced by A, B, C, E, F, G, H
E is influenced by D, F
F is influenced by D, E
G is influenced by A, B, C, D, H
H is influenced by G Supposing that the sequence of semijoin reduction steps performed so far is reduce T(G,s) [by H], and reduce T(C,r) [by G and H], there are two cases to consider:

Case 1: The first future reduction step via y goes from B to C. The minimum cardinality of row identifiers shipped by this step is then obtained when T(B,y) has been reduced by A. In this case, the corresponding cost $c_0$ is also the minimum cost caused by y.

Case 2: The first future reduction step via y goes from C to B. The minimum cardinality of row identifiers shipped by this step occurs when T(C,y), having been already reduced by G and H, will have been further reduced by D, but not by A or B (edge prohibited by assumption) or E or F (not influencing). This can be called cost $c_1$. The minimum possible cardinality for the still necessary reduction step from B to C now occurs when T(B,y) has been reduced by A, C, D, G, H. This can be called cost $c_2$. In this case the minimum cost caused by y is $c_1+c_2$.

In translating from cardinalities of sets of row identifiers to communication cost, a variable cost can be used that is inversely proportional to the transmission rate of the communication line plus a fixed cost reflecting its setup time. Both are considered to depend on the edge in question. In summary, the lower bound for the future cost incurred by the edge y is $\min\{c_0, c_1+c_2\}$. The estimation used for h(s) is the sum of all the lower bounds for all edges in the query graph.

To resolve a draw, i.e. if the cheapest costs of the SearchStates in the OPEN list are substantially the same so that the differences are insignificant, a modification of the pure A* algorithm is used that orders these states "by progress," which accelerates the search in such cases.

Another key for using the A* algorithm for join optimization is the use of well-tuned start heuristics. Several start heuristics have been developed which compete to find a good start solution. The start solution serves a twofold purpose: first, to prune those successor states s whose estimated cost f(s) is already higher than that of the start solution: These states should not enter the OPEN list. Second, the start solution serves as a fallback upon reaching a time limit. This is desirable since the pure A* algorithm does not proceed by improving on a prior solution. Before finding the optimum, the A* algorithm has no solution at all.

In describing two preferred start heuristics, it may be assumed that the query graph is a tree. While there still exists a cycle c in the query graph, an edge e of c is selected for breaking. If e connects the vertices n and m, n or m is selected for duplication. If n is selected, the edge e is reinserted into the query graph by connecting m to a new copy n' of n.

Furthermore, it may be assumed that every non-target vertex of the query graph influences at least one target node. For as long as a non-target vertex v can be found that does not influence any target node, v can be cut out and the subtree containing the target can be taken as the new query graph.

In accordance with some embodiments, a star heuristic can be used. The star heuristic exploits the fact that within a tree there are branchings, or "stars." The star heuristic runs essentially as follows.

The query graph is dissected at a branching into its branches. The branches are converted to new query graphs by setting two kinds of reduction targets. In a first case, the reduction target is the restriction of the original reduction target to the branch—this is a satisfying move. In a second case, the reduction target is merely the branching node—this is a centralizing move. A satisfying or centralizing move corresponds to several elementary moves (that is, reduction steps) between relations.

The set of all currently executable moves is then formed. Initially the set contains only the centralizing moves. The moves heuristic solutions are at least partially recursively checked, and the cheapest solution is accepted as the next part of the entire solution. The executed move is removed from the set of all executable moves. Whether any satisfying moves have now become executable is checked.

Finally, it is determined whether some special situations can be taken advantage of. These include, among others, whether a satisfying move is as cheap as its centralizing move in the same branch, and whether it is both possible and cheaper to swap a centralizing move with a satisfying move in a different branch.

The star heuristic is applied to a few of the "biggest" stars in the original query graph, applying some measure for the "size" of a star. In practice, to reduce run time, it is not used fully recursively but in connection with some simpler heuristics.

Alternatively, a snake heuristic can be used. The snake heuristic is simple yet still quite efficient. It works on a query graph that has the form of a pure chain, without any branchings. The heuristic is so called because the generated move sequence resembles the movement of a snake. The snake heuristic runs essentially as follows.

The first move is chosen by considering a few of the cheapest possible ones. Assuming that a move has been made and the target is not yet fully reduced, a determination is made whether to continue moving in the same direction or reverse the direction. When there is no choice (because the last move leads to the end of the chain), the query move turns and moves to directly behind the last turning point. When there is a choice, the costs of continuing in the same direction and of turning and moving to behind the last turning point are computed and compared. The cheaper option is selected as the next move.

In specific embodiments of the disclosure there may also be second order heuristics aiming at locally or globally improving on existing solutions provided by other heuristics.

In specific embodiments it is also possible to subject the overall method to some form of time management, controlling the sequence in which and how long optimization and heuristics may run.

Accordingly, a system and method for optimizing an outer join query execution plan includes constructing a query graph, especially computing for each node the set of all nodes influencing it, fixing for each target node the set of its needed reducers, determining for every admissible move in every admissible sequence its effects on needed reducer sets and tuple list related quantities, forming a directed graph for the admissible move sequences, constructing a start solution using several competing first and second order heuristics, dynamically generating a close lower bound estimation for the target distance h(s) of any digraph node s, valid for outer join queries and using it in an A* search algorithm on the directed graph, subject to a time allocation scheme. A system and method can further include modifying the basic A* algorithm for resolving approximate draws in the OPEN list. No big intermediate joins are materialized and shipped over a communication line, and the list L of occurring values may be (cumulatively) subject to different compression techniques.

Embodiments of the invention and all of the functional operations described in this specification can be implemented in digital electronic circuitry, or in computer software, firmware, or hardware, including the structures disclosed in this specification and their structural equivalents, or in combinations of them. Embodiments of the invention can be implemented as one or more computer program products, i.e., one or more modules of computer program instructions encoded on a computer readable medium, e.g., a machine readable storage device, a machine readable storage medium, a memory device, or a machine-readable propagated signal, for execution by, or to control the operation of, data processing apparatus.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of them. A propagated signal is an artificially generated signal, e.g., a machine-generated electrical, optical, or electromagnetic signal, that is generated to encode information for transmission to suitable receiver apparatus.

A computer program (also referred to as a program, software, an application, a software application, a script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to, a communication interface to receive data from or transfer data to, or both, one or more mass storage devices for storing data, e.g., magnetic, magneto optical disks, or optical disks.

Moreover, a computer can be embedded in another device, e.g., a mobile telephone, a personal digital assistant (PDA), a mobile audio player, a Global Positioning System (GPS) receiver, to name just a few. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Certain features which, for clarity, are described in this specification in the context of separate embodiments, may also be provided in combination in a single embodiment. Conversely, various features which, for brevity, are described in the context of a single embodiment, may also be provided in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Particular embodiments of the invention have been described. Other embodiments are within the scope of the following claims. For example, the steps recited in the claims can be performed in a different order and still achieve desirable results. In addition, embodiments of the invention are not limited to database architectures that are relational; for example, the invention can be implemented to provide indexing and archiving methods and systems for databases built on models other than the relational model, e.g., navigational databases or object oriented databases, and for databases having records with complex attribute structures, e.g., object oriented programming objects or markup language documents. The processes described may be implemented by applications specifically performing archiving and retrieval functions or embedded within other applications.

The invention claimed is:

1. A method for executing an outer join query on data arranged in a plurality of databases in which all joins are evaluated by semijoins, the method comprising:
generating, by one or more programmable processors executing one or more computer programs, a query graph of nodes maintaining the data arranged in the plurality of databases and target nodes for an outer join query, comprising:

computing, by the one or more programmable processors executing one or more computer programs, for each node the set of nodes influencing it;

computing, by the one or more programmable processors executing one or more computer programs, for each target node the set of its needed reducers;

predetermining, by the one or more programmable processors executing one or more computer programs, the effects of admissible move sequences;

forming, by the one or more programmable processors executing one or more computer programs, a directed graph for the admissible move sequences; and performing by the one or more programmable processors executing one or more computer programs, an optimization process using a search algorithm on the directed graph to determine a least-cost execution plan for the query, wherein the optimization process further comprises determining a start state, from a plurality of states in the formed directed graph, from which the determined execution plan is to start by performing one or more start heuristics procedures, the one or more start heuristics procedures comprising one or more first and second order heuristics, the least-cost execution plan for the query reducing total communication costs with regard to the query;

wherein a snake heuristic (i) determines costs for a next move continuing in a same direction along the query graph as compared to costs for the next move turning and moving behind a last turning point; and (ii) selects the next move with lesser costs.

2. A method in accordance with claim 1, further comprising using, by the one or more programmable processors executing one or more computer programs, a close lower bound estimation of the future cost h(s) of a search state s, valid for the outer join query.

3. A method in accordance with claim 1, further comprising executing by the one or more programmable processors executing one or more computer programs, the execution plan to execute the outer join query.

4. A method in accordance with claim 1, where the use of heuristics and optimization, with regard to sequence and time, by the one or more programmable processors executing one or more computer programs, is subject to a time management scheme.

5. A method in accordance with claim 1, wherein the optimization process includes an A* optimization process, and includes maintaining, by the one or more programmable processors executing one or more computer programs, at least two lists of search states including an OPEN list having search states whose successors have not yet been constructed, and a CLOSED list having those search states whose successors have been constructed.

6. A method in accordance with claim 1, further comprising, wherein if the least cost of the search states in the OPEN list are substantially the same, ordering, by the one or more programmable processors executing one or more computer programs, the substantially identical search states in the OPEN list according to progress.

7. A method as in claim 1, wherein the query graph is a chain that does not have any branching, and wherein the snake heuristic operates such that:

after a move has been made on the query graph by the query, but a corresponding target node has not yet been fully reduced, a determination is made whether to continue moving in a same direction or to reverse the direction;

when a next move on the query graph leads to a node on an end of the chain, the query moves turns and moves to directly behind a last turning point; and when there is a choice of next node in the query graph, costs for continuing in the same direction and turning and moving are determined and a move with lesser costs is selected.

8. A method for executing an outer join query on data arranged in a plurality of databases in which all joins are evaluated by semijoins, the method comprising:

generating by one or more programmable processors executing one or more computer programs, a query graph of nodes maintaining the data arranged in the plurality of databases and target nodes for the outer join query; and performing, by the one or more programmable processors executing one or more computer programs, an optimization process, using a search algorithm on a directed graph to determine a least-cost execution plan for the query, wherein the optimization process further comprises determining a start state, from a plurality of states in the directed graph, from which the determined execution plan is to start by performing one or more start heuristics procedures, the one or more start heuristics procedures comprising one or more first and second order heuristics;

wherein a snake heuristic (i) determines costs for a next move continuing in a same direction along the query graph as compared to costs for the next move turning and moving behind a last turning point; and (ii) selects the next move with lesser costs.

9. A method in accordance with claim 8, wherein generating a query graph further comprises:

computing, by the one or more programmable processors executing one or more computer programs, for each node the set of nodes influencing it; and computing, by the one or more programmable processors executing one or more computer programs, for each target node the set of its needed reducers.

10. A method in accordance with claim 8, further comprising using, by the one or more programmable processors executing one or more computer programs, a close lower bound estimation of the future cost h(s) of a search state s, valid for the outer join query.

11. A method in accordance with claim 8, further comprising executing, by the one or more programmable processors executing one or more computer programs, the execution plan to execute the outer join query.

12. A method in accordance with claim 8, where the use of heuristics and optimization, with regard to sequence and time, by the one or more programmable processors executing one or more computer programs, is subject to a time management scheme.

13. A method in accordance with claim 8, wherein the optimization process includes an A* optimization process, and includes maintaining, by the one or more programmable processors executing one or more computer programs, at least two lists of search states including an OPEN list having search states whose successors have not yet been constructed, and a CLOSED list having those search states whose successors have been constructed.

14. A method in accordance with claim 13, further comprising, wherein if the least cost of the search states in the OPEN list are substantially the same, ordering, by the one or more programmable processors executing one or more computer programs, the substantially identical search states in the OPEN list according to progress.

15. A method as in claim 8, wherein the query graph is a chain that does not have any branching, and wherein the snake heuristic operates such that:

after a move has been made on the query graph by the query, but a corresponding target node has not yet been fully reduced, a determination is made whether to continue moving in a same direction or to reverse the direction;

when a next move on the query graph leads to a node on an end of the chain, the query moves turns and moves to directly behind a last turning point; and when there is a choice of next node in the query graph, costs for continuing in the same direction and turning and moving are determined and a move with lesser costs is selected.

16. A computer program product embodied on a non-transitory storage media comprising, executable code to cause a data processing apparatus to perform operations comprising:

executing an outer join query on data arranged in a plurality of databases in which all joins are evaluated by semi-joins in order to reduce a tuple list, the outer join query comprising:

generating a query graph of nodes maintaining the data arranged in the plurality of databases and target nodes for a query, comprising:

computing for each node the set of nodes influencing it;

computing for each target node the set of its needed reducers;

predetermining the effects of admissible move sequences;

forming a directed graph for the admissible move sequences; and performing an optimization process, using a search algorithm on the directed graph to determine a least-cost execution plan for the query, wherein the optimization process further comprises determining a start state, from a plurality of states in the formed directed graph, from which the determined execution plan is to start by performing one or more start heuristics procedures, the one or more start heuristics procedures comprising one or more first and second order heuristic;

wherein a snake heuristic (i) determines costs for a next move continuing in a same direction along the query graph as compared to costs for the next move turning and moving behind a last turning point; and (ii) selects the next move with lesser costs.

17. A computer program product as in claim 16, wherein the query graph is a chain that does not have any branching, and wherein the snake heuristic operates such that:

after a move has been made on the query graph by the query, but a corresponding target node has not yet been fully reduced, a determination is made whether to continue moving in a same direction or to reverse the direction;

when a next move on the query graph leads to a node on an end of the chain, the query moves turns and moves to directly behind a last turning point; and when there is a choice of next node in the query graph, costs for continuing in the same direction and turning and moving are determined and a move with lesser costs is selected.

* * * * *